United States Patent Office 2,780,603
Patented Feb. 5, 1957

2,780,603

PLATINUM AND/OR PALLADIUM CATALYSTS

William P. Burton, Little Silver, N. J., assignor to The M. W. Kellogg Company, Jersey City, N. J., a corporation of Delaware No Drawing. Application November 21, 1952,
Serial No. 321,935

8 Claims. (Cl. 252—466)

This invention relates to a novel catalyst and the method of preparing the same, and more particularly pertains to a novel catalyst which is especially adapted for hydrocarbon conversion, e. g., reforming light hydrocarbon oils.

It is known that platinum or palladium catalysts become deactivated for a particular process or reaction over a prolonged period of time, and that the catalyst must be replaced in order to maintain a desired performance. Platinum or palladium catalysts are expensive to prepare, hence, care is taken to avoid deactivation which requires replacement. In the case of reforming light hydrocarbon oils, it is noticed that the platinum or palladium catalysts will lose their activity and/or selectivity and despite various known methods of treatment, catalyst property is not regained to the extent of making the further use of the catalyst attractive. The deactivated catalysts are generally subjected to expensive procedures for reclaiming the platinum or palladium, which is re-used again in the preparation of fresh catalyst. Now however, by means of this invention, the deactivated platinum or palladium catalyst is utilized in preparing new and useful catalysts.

It is an object of this invention to provide a novel platinum or palladium catalyst.

Another object of this invention is to provide a novel method of utilizing platinum or palladium catalysts in the preparation of my novel catalyst.

Still another object of this invention is to produce a novel catalyst and a method of producing same, which catalyst is especially effective for converting hydrocarbons, e. g., reforming light hydrocarbon oils.

Other objects and advantages of this invention will become apparent from the following description and explanation thereof.

By means of the present invention, a novel catalyst is obtained by the method which comprises mixing a fresh alumina material with a deactivated platinum or palladium on alumina catalyst. The fresh alumina material can include, for the purposes of this specification and the appended claims, alumina gel, alumina sol, activated alumina, all of which can be present in the hydrous, dried and/or calcined form prior to being admixed with the deactivated platinum or palladium on alumina catalyst. The form of alumina can be gamma, eta or mixtures of the two in varying proportions.

The alumina material can be prepared by the various known methods of obtaining such a material, some of which methods include reacting an aluminum salt, e. g., aluminum chloride, aluminum sulfate, aluminum nitrate, with an alkaline reagent, e. g., ammonium hydroxide, to precipitate alumina at a pH in the range of about 3.5 to 7.5, preferably about 4 to 6.5. The hydrous alumina gel thus produced can be used as such for admixture with the deactivated platinum or palladium on alumina catalyst, or it can be dried and/or calcined previous to use. Furthermore, this alumina prior to drying, etc., can be treated with more alkaline reagent to obtain a pH of about 7-8.5 or higher and then aged for at least about 17 hours. The alumina is also prepared by reacting aluminum metal and water in the presence of mercury or mercuric oxide, with or without the presence of a weak organic acid, e. g., acetic acid, formic acid, etc., or a strong acid, e. g., hydrochloric acid, sulfuric acid, etc. The alumina thus produced is in the sol form, and it may be converted to a gel by treatment with an alkaline reagent, e. g., ammonium hydroxide, to obtain a pH in the range of about 5–7 to about 11.5–12.0. The alumina thus treated may be aged for at least about 10 or at least about 17 hours, and then as such mixed with the deactivated platinum or palladium catalyst or dried and/or calcined previous to mixing. The alumina can also be the "activated" type which is well known to those skilled in the art.

The fresh alumina material disclosed above is admixed with deactivated platinum or palladium catalyst. It should be understood that the phrase "permanently deactivated" employed hereinafter and in the appended claims is defined to mean that the platinum or palladium catalyst has lost at least 40% of its original activity and such loss is not restorable by any conventional regeneration, reactivation or revivification means. The deactivated catalyst may be originally prepared by the various methods. Some of the methods of preparation include, for example, employing a compound of platinum or palladium, namely, an ammine complex of platinum or palladium, chloroplatinic acid or the potassium salt thereof, palladium sulfide, platinic sulfide, platinum polysulfide, etc., as the means of dispersing or distributing the active metallic component throughout the carrier material. The carrier material is alumina alone or alumina in combination with other carrier materials, such as for example, silica, magnesia, boria, etc. It is desirable to employ silica in combination with the alumina as the carrier material, because silica serves to improve the stability of the catalyst at elevated temperatures as well as in some instances possesses the property of inhibiting non-selective cracking in the hydroforming reaction by inhibiting the formation of carbonaceous material and/or normally gaseous hydrocarbon products. To accomplish this purpose, silica is usually employed in the amount of about 0.1 to about 15%, preferably about 1 to about 8% by weight, based on the total catalyst. After the suitable compound of platinum or palladium is admixed with the carrier material in the precursor state or as a calcined product, the mixtures are dried and then calcined at an elevated temperature in order to decompose the platinum or palladium compound to the active or catalytic state. The drying operation is usually accomplished by subjecting the mixture to a temperature of about 150° to about 400° F. for a period of about 2 to about 50 hours. On the other hand, the calcination treatment involves the use of a temperature of about 600° to about 1500° F. for a period of about 2 to about 50 hours.

The platinum or palladium catalyst may be one which has been prepared with an ammine complex of platinum or palladium. The platinum or palladium ammine complex is prepared from ammonia or substituted ammonia compounds, e. g., the amines, etc., and a platinum or palladium compound. The methods for preparing the ammine complexes involve complexing platinum or palladium compounds, such as a salt, e. g., a halide, nitrates, sulfates, sulfites, nitrites, oxyhalides, etc., with ammonia or substituted ammonia, e. g., alkylamine, alkyldiamine, quinolines, pyridines, hydrazo compounds, hydroxylamines, etc. The platinum or palladium in the complex may have a coordination valence of 4 to 6. The ammine complexes may be soluble in a polar or non-polar solvent, which is used for facilitating the catalyst preparation, or such ammines can be colloidally dispersed in either a polar or non-polar solvent in the required quantities. In either case, the solution or suspension of ammine complex should be employed in quantities which will provide uniform distribution of the complex throughout the entire catalyst mixture in the desired manner. However, it is preferred to employ the water soluble ammine complexes by reason that these compounds result in very effective types of catalysts. After the ammine complex of platinum and/or palladium is mixed with the desired carrier material, it is subjected to a drying step and then followed by a calcination or reduction treatment. The conditions for the drying and calcination procedures are given hereinabove.

The catalysts can also be prepared by the method comprising the decomposition of a compound of a metal selected from the group consisting of platinum and palladium to form a metallic residue on a carrier material in the presence of a metal such as mercury, zinc or cadmium or compounds of the foregoing metals. The inorganic compounds of mercury, zinc or cadmium include the oxides; hydroxides; salts, e. g., chlorides, chlorates, bromides, nitrates, sulfates, nitrites, sulfites, carbonates, bicarbonates, oxychlorides, fluorides, iodides, phosphates, phosphites; etc. Specific examples of inorganic compounds are mercuric acetate, zinc acetate, cadmium carbonate, etc. The quantity of activating agent employed is about 0.01 to about 10%, preferably about 0.5 to about 5%, based on the weight of the carrier. The activating agent may be added to the catalyst mass at any point prior to the calcination or reduction treatment. The conditions of drying and calcination are the same as those described above.

A promoting agent may also be used in the preparation of the catalyst. This agent is selected from the class consisting of an alcohol and a ketone which are soluble in water to the extent of at least about 0.5% by weight at 70° C. A variety of classes of compounds are included for this purpose, such as for example, primary, secondary and tertiary aliphatic mono-hydric alcohols, aliphatic dihydric alcohols, aliphatic trihydric alcohols, ketones of the aliphatic and aromatic type, aliphatic and aromatic alcohols, etc. Among the aliphatic alcohols, it is preferred to employ alkanols containing about 1 to about 9 carbon atoms in the molecule. The alkanones containing not more than 4 carbon atoms in the molecule are preferred. The amount of promoting agent employed is determined on the basis of the water which is present in the catalyst mass, prior to subjecting same to the drying and/or calcination treatment. It is desirable, ordinarily, to use about 1 to about 50% by weight, preferably about 10 to about 40% by weight of the promoting agent, based on the weight of water which is present in the catalyst mass, prior to subjecting the mass to a drying or calcination treatment. Specific examples of promoting agents which are useful include methanol, ethanol, propanol, butanol, acetone, glycol, benzyl alcohols, etc. The drying and calcination treatments are conducted in the manner described hereinabove.

The carrier material employed in the preparation of the platinum or palladium catalysts include alumina alone or in admixture with a large number and variety of materials. For example, the auxiliary carrier material can be silica, titania, charcoal, thoria, zirconia, pumice, kieselguhr, fuller's earth, magnesia, silica-magnesia, etc. Furthermore, the catalysts may be of the type which contain combined halogen, such as for example, fluorine, chlorine, etc. The halogen content can be from about .01 to about 10% by weight, based on the total catalyst.

In the finished catalyst, the platinum or palladium can constitute about 0.01 to about 5%, or more often, it is found that the catalytic agent is about 0.1 to about 2%, based on the total weight of the catalyst. The catalyst may contain larger amounts of platinum or palladium, such as for example, up to about 15% by weight. However, it is to be noted that the cost of such metals does not warrant using such large amounts thereof.

As noted above, the deactivated platinum or palladium catalysts may contain about 0.01 to about 5% by weight of platinum or palladium, based on the total catalyst, or more usually, about 0.1 to about 2%. The novel catalyst may also contain the same amount of platinum or palladium in the finished catalyst as specified above in regard to the deactivated catalyst. In the preparation of my invention, generally, about 0.1 to about 10 parts by weight of fresh alumina material are combined with about 1 part by weight of deactivated catalyst. Usually, it is desirable to obtain a finished catalyst which contains at least about 10% by weight of fresh alumina material, based on the total catalyst. The platinum or palladium catalyst may have been deactivated for various reasons, and it is important to admix therewith sufficient quantities of fresh alumina material to counteract or offset the factor causing poor activity and/or selectivity of the catalyst. As previously mentioned, the fresh alumina material can be added to the deactivated catalyst as a hydrous, dried and/or calcined material. If the hydrous material is employed, the mixture of deactivated catalyst and fresh alumina is then subjected to a drying and/or calcination treatment under the conditions specified hereinabove. Similarly, if the fresh alumina material has been previously dried, after mixing with the deactivated catalyst, it is then subjected to a calcination treatment under the conditions specified hereinabove. When the fresh alumina material has been previously calcined, the only step which may be taken is to insure thorough mixing of the deactivated catalyst and fresh alumina prior to use for any specific reaction or process.

It is desirable to employ the mixture of fresh alumina material and deactivated platinum or palladium catalyst in pellet form or any other physical form which involves compacting of the alumina material with the deactivated catalyst. This procedure should be preferably preceded by a thorough mixing operation in order to insure uniform distribution of the alumina material throughout the deactivated catalyst. The pellets of new catalyst or any other compact form serve to prevent separation of fresh alumina material from the deactivated catalyst during use under actual operation conditions. However, it should be understood that while the compacting of this catalyst is preferred as a safeguard in preventing the separation of the catalyst components, nevertheless, it is intended to include within the scope of this invention, a catalyst mixture in the finely divided form. The powdered or finely divided material serving as a catalyst can be prepared in a preferred manner by first mixing the fresh alumina material wtih the deactivated catalyst in any suitable size convenient for the operation, followed by pelleting or compacting operation which involves compressing the catalyst components together by suitable means, followed by a pulverizing step whereby the pelleted or compacted form of catalyst is ground to a finely divided state. The compacting step serves as a means for blending the fresh alumina material with the deactivated catalyst in a manner which tends to prevent segregation or separation of the particles during use under actual operating conditions.

The novel catalyst proposed hereinunder can be employed in a variety of reactions, such as for example, dehydrogenation, hydrogenation, hydrogenolysis, cracking, hydrocracking (i. e., cracking under hydrogen pressure), isomerization, oxidation, aromatization, cyclization, hydrodesulfurization, hydrocarbon synthesis, dealkylation, hydrodechlorination, dehydroxylation, alkylation, polymerization, hydrogen exchange systems, etc. Of the applications mentioned above, the catalyst of this invention is particularly applicable for the conversion of hydrocarbon oils, more specifically the reforming of light hydrocarbon oils including gasolines, naphthas and kerosenes, alone or mixtures thereof.

In order to more fully understand the present invention, reference will be had to specific examples thereof, however, it should be understood that no undue limitations or restrictions are to be imposed by reason thereof.

In all of the following experiments, the original catalyst was obtained by the following procedure.

5210 grams of aluminum chloride, $AlCl_3.6H_2O$, were dissolved in 14 liters of water and then mixed with 3.8 liters of concentrated ammonium hydroxide to obtain precipitated alumina gel. 300 ml. of concentrated ammonium hydroxide and 3 liters of water were further added in order to adjust the pH of the alumina gel to 7.10 at 32° C. and also to obtain a stirrable mass. The mass was filtered and the filter cakes were washed to remove chlorine compounds and reslurrying the same with a solution of 13 liters of water and 130 ml. of concentrated ammonium hydroxide for one hour and then filtering again. After nine more similar washings, a slight trace of chlorine was found in the filtrate. The washed alumina gel was peptized with 32 cc. of glacial acetic acid (.1 mol of acetic acid per mol of alumina) which lowered the pH to 4.35 at 20° C.

Platinum ammine complex was prepared by dissolving 4.2 grams of platinum chloride in 375 cc. of concentrated ammonium hydroxide. To this solution was added about 5 ml. of glacial acetic acid to obtain a pH of substantially 7. The complex thus prepared was poured into the above alumina and the mixture stirred for 1 hour. The pH of the mixture was 5.27 at 32° C. The slurry was dried at a temperature of 230° F. on a porcelain dish in a small oven. The dried mass weighed 807 grams. The dried catalyst mass was ground to pass through a 40 mesh screen and in this condition, it was calcined for two hours at 1000° F. The resultant catalyst mass weighed 563 grams, and appeared grayish with small black specks throughout. It was then pelleted into pills of 3/16 inch size, and the pills were calcined for an additional 4 hours at 1000° F. The final catalyst has a platinum content of 0.47% by weight.

Platinum or palladium is effective as a catalyst for reforming or hydroforming light hydrocarbon oils, e. g., naphtha or kerosene stocks. In the reforming operation, the conditions may be varied widely to include temperatures of about 600 to about 1050° F., preferably about 800 to about 950° F.; weight space velocities of about 0.5 to about 10.0 pounds of naphtha per hour per pound of catalyst in the reaction zone, preferably about 0.25 to about 5.0 pounds of naphtha per pound of catalyst; a hydrogen rate of about 0.5 to about 20 mols of hydrogen per mol of hydrocarbon reactants and a pressure of about 50 to about 1000 p. s. i. g., preferably about 100 to about 750 p. s. i. g. If a moving bed system is employed, the catalyst to oil ratio, on a weight basis, is generally about 0.01 to about 10.

The catalyst described above was evaluated by employing same to reform a Mid-Continent of heavy naphtha having an initial boiling point of 228° F. and an end point of 435° F. This naphtha had an octane number (C. F. R. M.) of 30 and contained approximately 9% aromatics by volume. The catalyst was tested on a laboratory scale using a fixed bed technique in a reactor of 550 cc. capacity. Hydrogen was fed in a pure state at the rates indicated in the table given hereinbelow, designated as S. C. F. B., meaning standard cubic feet of hydrogen per barrel of oil feed, measured at 60° F. and 760 mm. of mercury. Regeneration of the catalyst was conducted by purging the catalyst with hydrogen after the same had become partially deactivated by the accumulation of carbonaceous deposits. The pressure of the system was released and then purged with nitrogen. The catalyst was then heated to 950° F. and a mixture of air and nitrogen containing 2–8% by volume of oxygen was passed over the catalyst at the rate of 20 cubic feet per hour and for a period of about half an hour. The oxygen concentration was increased gradually from 2 to 20% during the regeneration run, at each time it was noticed that the temperature was falling from 1000° F. During this operation, the temperature at various points in the bed was ascertained with two thermocouples, one located in the upper part and the other in the lower part of the bed. The flow of air through the bed was continued for about ½ hour after the temperature dropped back to 950° F. After another nitrogen purge, the mixture was again placed under hydrogen pressure while the temperature was adjusted before charging naphtha feed.

The data obtained in Table I below demonstrates by comparison the extent of permanent deactivation undergone by the catalyst prepared in accordance with the procedure disclosed herein.

Table I

| Run No | 1 | 2 | 3 | 4 |
| --- | --- | --- | --- | --- |
| No. of Regenerations | 35 | 40 | 41 | 42 |
| Process Conditions: | | | | |
| Temperature, °F | 901 | 900 | 901 | 901 |
| Pressure, p. s. i. g | 500 | 500 | 500 | 500 |
| Space Vel., Wo/hr./Wc | 1.01 | 1.12 | 1.0 | 1.0 |
| Hydrogen Rate, S. C. F. B | 4,610 | 4,440 | 5,000 | 5,000 |
| Length of Run, Hrs | 8 | 8 | 8 | 8 |
| Yields:[1] | | | | |
| Aromatics in C4 Free Gasoline, Wt. Percent | 45.4 | 31.4 | 29.0 | |
| 100% C4 Gasoline, Vol. Percent | 85.9 | 82.4 | | |
| Excess Butanes, Vol. Percent | -1.1 | 21.8 | | |
| 10# RVP Gasoline, Vol. Percent | 87.0 | 60.6 | | |
| Octane No. Clear: | | | | |
| 10# RVP Gasoline, C. F. R. M | 80.5 | 65.4 | | |
| 10# RVP Gasoline, C. F. R. R | 80.1 | 70.6 | 71 | 70 |

[1] Gasoline of 400° F. (E. P.).

From Table I, it is noted that the platinum catalyst was a satisfactory reforming catalyst as shown in Run No. 1. After further use, the catalyst began to show excessive cracking tendencies which is evident from the increase in yield of excess butanes, the decrease in yield of gasoline and the lowering of the octane number of the gasoline product. The decrease in yield of gasoline illustrates that the catalyst has lost selectivity for reforming; whereas the decrease in the octane number of the gasoline product indicates that the catalyst has lost activity for reforming naphtha. Normally, this catalyst would be discarded from the unit and considered as a permanently deactivated catalyst, since, as is evident from Runs 2–4 inclusive, further regeneration had no apparent beneficial effect upon catalytic property.

The deactivated catalyst was then used in preparing the catalyst of this invention. The catalyst was first ground and then diluted with a fresh calcined alumina, which was prepared in the manner described hereinabove for the platinum catalyst. The mixture of calcined alumina and the catalyst employed for the run given in Table I was then pelleted to provide a catalyst consisting of 60% added alumina and 40% of the deactivated catalyst. As a result of the dilution, the final composition of the catalyst was 0.2% platinum and 99.8% alumina. In this state, the catalyst was tested under reforming conditions and the result is given in Table II below.

Table II

| | |
| --- | --- |
| Run No | 1 |
| No. of regenerations | 0 |
| Process conditions: | |
| Temperature, °F | 905 |
| Pressure, p. s. i. g | 500 |
| Space vel., Wo/hr./Wc | 1.00 |
| Hydrogen rate, S. C. F. B | 4480 |
| Length of run, hrs | 8 |
| Yields: | |
| Aromatics in C4 free-gasoline, wt. percent | 29.0 |
| 100% C4 gasoline, vol. percent | 91.4 |
| Excess butanes, vol. percent | 5.3 |
| 10# RVP gasoline, vol. percent | 86.1 |
| Octane No. clear: | |
| 10# RVP gasoline, C. F. R. M | 70.0 |
| 10# RVP gasoline, C. F. R. R | 74.0 |

From Table II above, it is to be noted that the selectivity of the novel catalyst is significantly better than the selectivity of the deactivated catalyst for which data is presented in Table I above. In this regard, it is to be noted that the yield of 10# RVP gasolines for the deactivated catalyst is 60.6% by volume; whereas the yield of the same product for the novel catalyst is 86.1% by volume. Furthermore, it is to be noted that the octane number of the 10# RVP gasoline in the case of the new catalyst is significantly greater than the octane number of the same product for the run involving the use of the deactivated platinum catalyst. Further, the results reported for my novel catalyst are greater than what they appear to be by reason that the deactivated catalyst contained about 0.5% platinum; whereas my novel catalyst contained approximately 0.2% platinum. It is to be expected that better results would be obtained by using the catalyst containing 0.5% platinum over a catalyst having a smaller amount, namely, about 0.2% of platinum, under comparable operating conditions.

Having thus described my invention by reference to specific examples thereof, it should be understood that no undue limitations or restrictions are to be imposed by reason thereof, but the scope of my invention is defined by the appended claims.

I claim:

1. A heterogeneous catalyst composition comprising in combination a mixture of about 0.1 to about 10 parts by weight of fresh alumina particles and 1 part by weight of a permanently deactivated catalyst particles comprising a catalytic element selected from the group consisting of platinum and palladium supported on alumina.

2. The catalyst composition of claim 1 wherein the particles are present as agglomerated particles.

3. The catalyst composition of claim 1 wherein the particles are present as discrete particles.

4. A method of preparing a catalyst which comprises combining a fresh alumina material with a permanently deactivated catalyst comprising a catalytic element selected from the group consisting of platinum and palladium supported on alumina.

5. A method of preparing a catalyst which comprises combining about 0.1 to about 10 parts by weight of fresh alumina material with about 1 part by weight of a permanently deactivated catalyst comprising about 0.01 to about 5.0% by weight of a catalytic element selected from the group consisting of platinum and palladium supported on alumina.

6. A method of preparing a catalyst which comprises admixing about 0.1 to about 10 parts by weight of hydrous alumina with about 1 part by weight of a permanently deactivated catalyst comprising about 0.01 to about 5% by weight of a catalytic element selected from the group consisting of platinum and palladium supported on alumina, and calcining the resultant mixture to convert the hydrous alumina to a suitable form for use in the finished catalyst.

7. The method of claim 5 wherein the fresh alumina material is a calcined alumina gel and the catalytic element is platinum.

8. The method of claim 6 wherein the catalytic element is platinum.

References Cited in the file of this patent

UNITED STATES PATENTS

| | | |
|---|---|---|
| 2,479,110 | Haensel | Aug. 16, 1949 |
| 2,582,428 | Haensel | Jan. 15, 1952 |
| 2,611,749 | Haensel | Sept. 23, 1952 |